(12) United States Patent
Carlton et al.

(10) Patent No.: US 11,649,186 B2
(45) Date of Patent: May 16, 2023

(54) VAPORIZERS AND APPARATUSES FOR FORMING GLASS OPTICAL FIBER PREFORMS COMPRISING THE SAME

(71) Applicant: CORNING INCORPORATED, Corning, NY (US)

(72) Inventors: Stephen Mitchell Carlton, Rocky Point, NC (US); Paul Andrew Chludzinski, Hampstead, NC (US); Jonathan Robert Greveling, Concord, NC (US); Nikolaos Pantelis Kladias, Horseheads, NY (US); Robert Walter Nason, Wilmington, NC (US); Abhijit Rao, Painted Post, NY (US)

(73) Assignee: Corning Incorporated, Corning, NY (US)

(*) Notice: Subject to any disclaimer, the term of this patent is extended or adjusted under 35 U.S.C. 154(b) by 279 days.

(21) Appl. No.: 16/782,319

(22) Filed: Feb. 5, 2020

(65) Prior Publication Data
US 2020/0255319 A1 Aug. 13, 2020

Related U.S. Application Data

(60) Provisional application No. 62/805,005, filed on Feb. 13, 2019.

(51) Int. Cl.
*C03B 37/014* (2006.01)
(52) U.S. Cl.
CPC ...... *C03B 37/0142* (2013.01); *C03B 2207/34* (2013.01); *C03B 2207/85* (2013.01)
(58) Field of Classification Search
None
See application file for complete search history.

(56) References Cited

U.S. PATENT DOCUMENTS 3,324,632 A 6/1967 Berneike et al.
5,078,092 A * 1/1992 Antos ................. C23C 16/4481
118/726

(Continued)

FOREIGN PATENT DOCUMENTS

CN 106482400 A 3/2017
CN 107149784 A 9/2017

(Continued)

OTHER PUBLICATIONS

FR 2833853 machine translation, Brion et al., Evaporator for separating effluent phases has diffuser to disperse effluent in droplets in heated chamber, Jun. 2003. (Year: 2003).*

(Continued)

*Primary Examiner* — Queenie S Dehghan
(74) *Attorney, Agent, or Firm* — Amy T. Lang; John P. McGroarty

(57) ABSTRACT

Vaporizers and systems for vaporizing liquid precursor for forming glass optical fiber preforms are provided. The vaporizer includes an expansion chamber at least partially enclosed by a side wall, the expansion chamber comprising an upper end and a lower end with the side wall disposed between the upper end and the lower end. The vaporizer further includes a closed-loop liquid delivery conduit positioned in the expansion chamber proximate to the upper end of the expansion chamber, wherein the closed-loop liquid delivery conduit comprises a plurality of nozzles oriented to direct a spray of liquid precursor onto an inner surface of the side wall. Further, the vaporizer includes at least one supply conduit positioned proximate the upper end of the expansion chamber and coupled to the closed-loop liquid delivery conduit, and a vapor delivery outlet coupled to the expansion chamber and configured to direct vaporized liquid precursor from the expansion chamber.

18 Claims, 8 Drawing Sheets

(56) References Cited

U.S. PATENT DOCUMENTS

| | | | |
|---|---|---|---|
| 5,356,451 | A | 10/1994 | Cain et al. |
| 5,558,687 | A | 9/1996 | Cain |
| 5,922,100 | A | 7/1999 | Cain et al. |
| 5,938,853 | A | 8/1999 | Williams |
| 8,650,905 | B2 | 2/2014 | De Larminat et al. |
| 2012/0276291 | A1 | 11/2012 | Bird et al. |
| 2016/0200622 | A1* | 7/2016 | Stirling ............... C03B 37/0142 65/421 |
| 2016/0216045 | A1* | 7/2016 | Chan ....................... F28F 13/12 |

FOREIGN PATENT DOCUMENTS

| | | |
|---|---|---|
| CN | 107421166 A | 12/2017 |
| FR | 2833853 A1 | 6/2003 |

OTHER PUBLICATIONS

Abbas et al; "Measurement of Thermophysical Pure Component Properties for a Few Siloxanes Used as Working Fluids for Organic Rankine Cycles," Ind. Eng. Chem. Res., 50, (2011), p. 9748-9757.

Alhusseini et al., "Falling Film Evaporation of Single Component Liquids," Int. J. Heat Mass Transfer; vol. 41, No. 12, (1998), p. 1623-1632.

Chen et al; "An Analysis of Black Liquor Falling Film Evaporation," Int. J. Heat and Mass Transfer, vol. 47, (2004), p. 1657-1671.

Chun, K.R., Seban, R.A., "Heat Transfer to Evaporating Liquid Films," J. of Heat Transfer, 93, 197, (1971), 391-396.

Flaningham; "Vapor Pressures of Poly(Dimethylsiloxane) Oligimers," J. Chem. Eng. Data, 31, 1986, p. 266.

Hunter et al; "Organo-Silicon Polymers. The Cyclic Dimethyl Siloxanes," J. Amer. Chem. Soc., 68, (1946), 667.

Hurd; "Studies on Siloxanes. I. The Specific Volume and Viscosity in Relation to Temperature and Constitution," J. American Chem. Soc., 68 (3), (1946), p. 364-370.

International Search Report and Written Opinion of the International Searching Authority; PCT/US2020/014503; dated Apr. 8, 2020; 11 Pages; European Patent Office.

Mills et al; "The Application of Bond Parachors to Organosilicon Chemistry," J. Amer. Chem Soc., 76, (1954), 2672.

Osthoff et al; "Physical Properties of Organosilicon Compounds. III. Thermodynamic Properties of Octamethylcyclotetrasiloxane," J. Amer. Chem. Soc., 76, 1954, p. 399.

Sugden; "The Variation of Surface Tension With Temperature and Some Related Functions," J. Chem. Soc.; 125, (1924), 32.

Waterman et al; "Statistical-Graphical Survey of Series of Linear and Cyclic Dimethylsiloxanes," J. Appl. Chem,, 8, (1958), 625.

Wikipedia; "Heat Transfer Coefficient"; 10 Pages; Last Edited Jan. 30, 2020 https://en.wikipedia.org/wiki/Heat_transfer_coefficient.

Missenard, A., "Methode Additive Pour la Determination de la Chaleur Molaire des Liquids," Comptes Rendus, 260(5), (1965), 5521.

* cited by examiner

VAPORIZERS AND APPARATUSES FOR FORMING GLASS OPTICAL FIBER PREFORMS COMPRISING THE SAME This application claims the benefit of priority to U.S. Provisional Application Ser. No. 62/805,005 filed on Feb. 13, 2019, the content of which is relied upon and incorporated herein by reference in its entirety.

BACKGROUND

Field

The present specification generally relates to apparatuses for forming glass optical fiber preforms and, more specifically, to vaporizers for vaporizing glass precursor materials used in the manufacture of glass optical fiber preforms.

Technical Background

Glass optical fiber is generally formed by drawing the optical fiber from a glass optical fiber preform. The glass preform may be formed by depositing silica-based glass soot on a bait rod or core cane by vapor deposition. Cyclosiloxanes, such as octamethylcyclotetracyloxane (OMCTS) are commonly used as a liquid precursor for producing pyrogenically generated silica-based particles which are deposited on the bait rod to form the glass optical fiber preform. The liquid precursor is initially vaporized in a vaporizer and the vaporized liquid precursor is fed to a burner, where they undergo an oxidation reaction at high temperature to form silica-based glass soot. The silica-based glass soot is deposited on the bait rod to form a porous layer or layers of silica-based glass soot. Thereafter, the porous layer or layers of silica-based glass soot are densified to complete the formation of the glass optical fiber preform.

During the vaporization process, liquid precursor that does not vaporize can polymerize in the vaporizer and result in the formation of a gel which collects in the lower regions of the vaporizer. The build-up of the gel necessitates periodic shut down and cleaning of the vaporizer and the related apparatus for forming glass optical fiber preforms. As such, incomplete vaporization of the liquid precursor by the vaporizer may diminish manufacturing efficiencies and increase manufacturing costs.

Accordingly, a need exists for alternative vaporizers for apparatuses for forming glass optical fiber preforms.

SUMMARY

According to a first aspect A1, an apparatus comprising a vaporizer configured to vaporize liquid precursor for formation of glass optical fiber preforms includes an expansion chamber at least partially enclosed by a side wall. The expansion chamber comprises an upper end and a lower end with the side wall disposed between the upper end and the lower end. The vaporizer further comprises a closed-loop liquid delivery conduit positioned in the expansion chamber proximate to the upper end of the expansion chamber. The closed-loop liquid delivery conduit comprises a plurality of nozzles oriented to direct a spray of liquid precursor onto an inner surface of the side wall. The vaporizer further comprises at least one supply conduit positioned proximate the upper end of the expansion chamber and coupled to the closed-loop liquid delivery conduit.

A second aspect A2 includes the apparatus of aspect A1, further comprising a cap positioned at the upper end of the expansion chamber and at least partially enclosing the expansion chamber, wherein the at least one supply conduit extends through the cap.

A third aspect A3 includes the apparatus of aspect A2, wherein the closed-loop liquid delivery conduit is spaced a distance s from the cap, wherein s is greater than or equal to 0 centimeters and less than or equal to 40 centimeters.

A fourth aspect A4 includes the apparatus of aspect A3, wherein s is 0 centimeters.

A fifth aspect A5 includes the apparatus of any of A1-A4, wherein a perimeter of the closed-loop liquid delivery conduit is spaced a distance r from the side wall of the expansion chamber, wherein the distance r is greater than or equal to 1 centimeter and less than or equal to 2.54 centimeters.

A sixth aspect A6 includes the apparatus of any of A1-A5, wherein the closed-loop liquid delivery conduit comprises an internal cross-sectional diameter greater than or equal to 0.25 centimeters and less than or equal to 0.75 centimeters.

A seventh aspect A7 includes the apparatus of any of A1-A6, wherein the plurality of nozzles are equidistantly spaced about a perimeter of the closed-loop liquid delivery conduit.

An eighth aspect A8 includes the apparatus of any of A1-A7, wherein the plurality of nozzles comprise a primary flow vector oriented at an angle θ greater than or equal to 30° and less than or equal to 55° relative to a horizontal plane.

A ninth aspect A9 includes the apparatus of any of A1-A8, wherein the plurality of nozzles comprise a nozzle diameter greater than or equal to 0.045 centimeters and less than or equal to 0.1 centimeters.

A tenth aspect A10 includes the apparatus of any of A1-A9, wherein the plurality of nozzles comprise a nozzle spacing greater than or equal to 0.75 centimeters and less than or equal to 2.54 centimeters.

An eleventh aspect A11 includes the apparatus of any of A1-A10, wherein the inner surface of the side wall of the expansion chamber has a surface area greater than or equal to 0.18 square meters and less than or equal to 1 square meter.

A twelfth aspect A12 includes the apparatus of any of A1-A11, wherein the side wall of the expansion chamber is formed from a material having a thermal conductivity of at least 100 BTU/hr-ft-F.

A thirteenth aspect A13 includes the apparatus of any of A1-A12, wherein the side wall of the expansion chamber comprises a plurality of channels disposed in the side wall.

A fourteenth aspect A14 includes the apparatus of any of A1-A13, wherein the side wall of the expansion chamber comprises an inner shell, an outer shell spaced from the inner shell, and a mixing insert disposed in an annular flow channel between the inner shell and the outer shell, the mixing insert extending around the inner shell in a helical configuration.

A fifteenth aspect A15 includes an apparatus for forming glass optical fiber preforms. The apparatus comprises a vaporizer comprising an expansion chamber at least partially enclosed by a side wall. The expansion chamber comprises an upper end and a lower end with the side wall disposed between the upper end and the lower end. The vaporizer further comprises a cap positioned at the upper end of the side wall and at least partially enclosing the expansion chamber. At least one supply conduit extends through the cap. The vaporizer further comprises a closed-loop liquid delivery conduit positioned in the expansion chamber. The closed-loop liquid delivery conduit is coupled to the at least one supply conduit and the closed-loop liquid delivery conduit comprises a plurality of nozzles oriented to direct a spray of liquid precursor onto an inner surface of the side wall. Each of the nozzles comprises a primary flow vector oriented at an angle θ greater than or equal to 30° and less than or equal to 55° relative to a horizontal plane. The vaporizer further comprises a vapor delivery outlet coupled to the expansion chamber and configured to extract vaporized liquid precursor from the expansion chamber. The apparatus for forming glass optical fiber preforms further comprises a liquid precursor source coupled to the at least one supply conduit, a burner coupled to the vapor delivery outlet, and a glass lathe configured to rotate the glass optical fiber preform. The burner is configured to translate along an axis of rotation axis of rotation of the glass lathe.

A sixteenth aspect A16 includes the apparatus of aspect A15, wherein the liquid precursor is delivered to the expansion chamber at a flow rate greater than 475 grams per minute.

A seventeenth aspect A17 includes the apparatus of any of A15 or A16, wherein the side wall of the expansion chamber comprises an inner shell, an outer shell, and a mixing insert disposed between the inner shell and the outer shell, the mixing insert extending around the inner shell in a helical configuration.

An eighteenth aspect A18 includes the apparatus of any of A15-A17, further comprising a heating system coupled to the side wall of the expansion chamber and configured to heat at least a portion of the side wall to a temperature sufficient to vaporize the liquid precursor.

A nineteenth aspect A19 includes the apparatus of any of A15-A18, wherein a perimeter of the closed-loop liquid delivery conduit is spaced a distance r from the side wall of the expansion chamber, wherein the distance r is greater than or equal to 1 centimeter and less than or equal to 2.54 centimeters.

A twentieth aspect A20 includes the apparatus of any of A15-A19, wherein a nozzle spacing of the plurality of nozzles is greater than or equal to 0.75 centimeters and less than or equal to 2.54 centimeters.

Additional features and advantages of the vaporizers and apparatuses for the vapor deposition of glass precursor described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
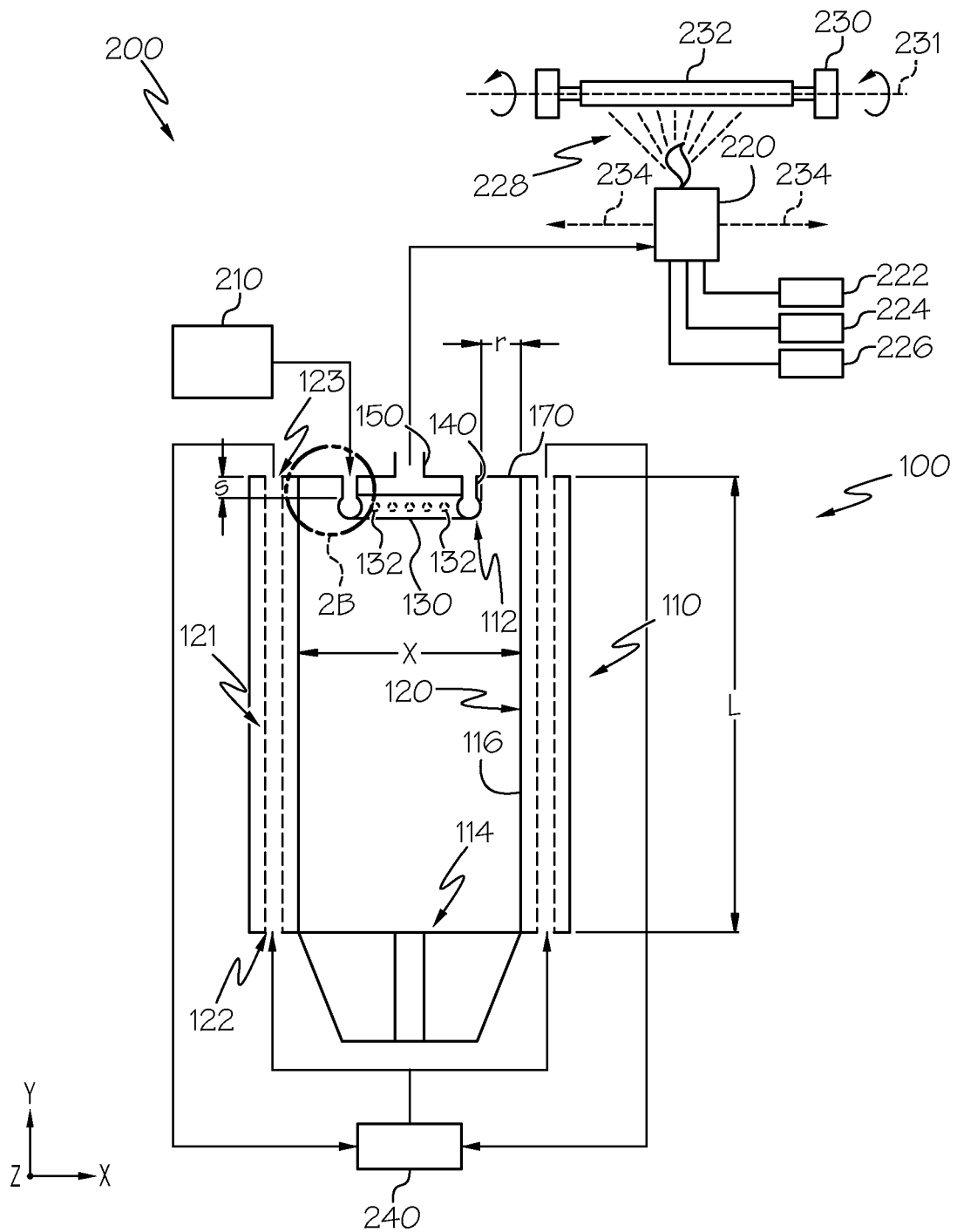
FIG. 1 schematically depicts an apparatus for the vapor deposition of glass precursor, according to one or more embodiments described herein.

Reference will now be made in detail to various embodiments of vaporizers, apparatuses for forming glass optical fiber preforms comprising vaporizers, and methods for using the same, embodiments of which are illustrated in the accompanying drawings. Whenever possible, the same reference numerals will be used throughout the drawings to refer to the same or like parts. One embodiment of an apparatus for forming glass optical fiber preforms comprising a vaporizer is schematically depicted in FIG. 1. In the embodiments described herein, the vaporizer may include an expansion chamber at least partially enclosed by a side wall. The expansion chamber includes an upper end and a lower end with the side wall disposed between the upper end and the lower end. The vaporizer further includes a closed-loop liquid delivery conduit positioned in the expansion chamber proximate to the upper end of the expansion chamber. The closed-loop liquid delivery conduit comprises a plurality of nozzles oriented to direct a spray of liquid precursor onto an inner surface of the side wall. The vaporizer may also include at least one supply conduit positioned proximate the upper end of the expansion chamber and coupled to the closed-loop liquid delivery conduit. A vapor delivery outlet may be coupled to the expansion chamber and configured to direct vaporized liquid precursor from the expansion chamber. Various embodiments of vaporizers, apparatuses for forming glass optical fiber preforms comprising vaporizers, and methods of using the same will be described in further detail herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used throughout this disclosure, the phrase "liquid precursor" refers to the precursor materials delivered to the vaporizer in liquid form such as, without limitation, octamethylcyclotetrasiloxane (OMCTS) as well as various other siloxane species and impurities which may be present in the OMCTS when delivered to the vaporizer in liquid form.

Apparatuses for forming glass optical fiber preforms generally include a vaporizer which supplies vaporized liquid precursor to a burner. The burner converts the vaporized liquid precursor to silica-based glass soot by flame pyrolysis. The silica-based glass soot is, in turn, deposited on a bait rod as the bait rod is rotated in a glass lathe. The burner may be configured to translate along an axis of rotation of the glass lathe to deposit the silica-based glass soot along the length of the bait rod as the bait rod is rotated with the glass lathe.

In conventional vaporizers used with such apparatuses, liquid precursor that is not vaporized may pool in the lower region of the vaporizer where the liquid precursor gels, fouling the interior of the vaporizer. Excessive pooling of the liquid precursor in the vaporizer and the subsequent gelation increases the back pressure in the vaporizer and diminishes the performance of the apparatus. Accordingly, frequent cleaning of the vaporizer is needed to mitigate these issues. However, frequent cleaning of the vaporizer requires equipment down time and, as a result, adversely impacts manufacturing productivity.

Furthermore, in conventional vaporizers, liquid precursor is introduced into the vaporizer through a delivery system which comprises nozzles placed above and below one another. The positioning of these nozzles may create low pressure regions which cause the spray of liquid precursor emitted from an upper nozzle to interact with the spray of liquid precursor emitted from a lower nozzle. This interaction may reduce the amount of liquid precursor that actually contacts the inner surface of the side wall of the expansion chamber of the vaporizer (i.e., the location where the liquid precursor is vaporized), thereby reducing the amount of liquid precursor that is actually vaporized and increasing the amount of liquid precursor that pools and gels at the lower end of the expansion chamber.

In addition, conventional vaporizers do not allow for relatively high flow rates of liquid precursor, such as flow rates of greater than 450, 475, or 500 grams per minute, due to size constraints associated with conventional liquid delivery systems used in the vaporizers. As a result, these conventional liquid delivery systems limit the efficiency of the vaporizer and the apparatus in which the vaporizer is employed. In particular, the vaporization rate of liquid precursor through a vaporizer is directly related to the surface area (specifically the surface area of the inner surface of the side wall) onto which the liquid precursor is sprayed and thereafter evaporated from. However, conventional vaporizers generally have a relatively small surface area of the inner surface of the side wall (generally less than 0.2 square meters) due to the configuration of the liquid delivery system, meaning that the amount of liquid precursor capable of being vaporized in the expansion chamber is somewhat limited.

The vaporizers and apparatuses for forming glass optical fiber preforms disclosed herein address the aforementioned problems associated with conventional vaporizers.

Referring now to FIG. 1, an apparatus 200 for forming glass optical fiber preforms is schematically depicted. The apparatus 200 generally includes a vaporizer 100, a liquid precursor source 210, a burner 220, and a glass lathe 230. The vaporizer 100 includes an expansion chamber 110 at least partially enclosed by a side wall 120. The phrase "at least partially enclosed," as used herein, means that the side wall 120 bounds the expansion chamber 110 on at least one side. For example, the sidewall 120 bounds at least the vertical sides of the expansion chamber 110 (i.e., the sides of the expansion chamber extending in the +/− Y direction of the coordinate axes depicted in the figures) in the embodiment depicted in FIG. 1. In this embodiment, the side wall 120 may be, for example, a cylinder enclosing the expansion chamber 110. In embodiments (not depicted), the side wall 120 may form a half cylinder or a quarter cylinder in horizontal cross section (i.e., a cross section defined by the X-Z plane in the coordinate axes depicted in the figures) partially enclosing the expansion chamber 110. In embodiments (not depicted), the side wall 120 may be rectangular or square in horizontal cross section, or any other suitable cross-sectional shape. The vaporizer 100 further includes a closed-loop liquid delivery conduit 130 for supplying liquid precursor to the interior of the expansion chamber 110, at least one supply conduit 140 for supplying the liquid precursor to the closed-loop liquid delivery conduit 130, and a vapor delivery outlet 150 for directing vaporized liquid precursor from the expansion chamber 110.

In the embodiments described herein, the liquid precursor source 210 is coupled to the supply conduit 140 of the vaporizer 100. In this way, liquid precursor from the liquid precursor source 210 may be directed into the expansion chamber 110 where the liquid precursor is vaporized. The burner 220 is coupled to the vapor delivery outlet 150 of the vaporizer 100 such that liquid precursor vaporized in the expansion chamber 110 of the vaporizer 100 is supplied to the burner 220 to be reacted in the flame of the burner 220. The burner 220 is also coupled to a fuel source 222 for supplying fuel to the burner 220, an air source 224 for supplying air to the burner 220, and, in some embodiments, a dopant source 226 for supplying a dopant or dopant precursor to the burner 220. In embodiments, the air source 224 may include oxygen. As a nonlimiting example, the dopant source may include a precursor source of germania (GeO$_2$), such as germanium tetrachloride (GeCl$_4$).

In the embodiments described herein, the burner 220 is positioned proximate to the glass lathe 230 and is configured to translate parallel to the axis of rotation 231 of the glass lathe 230, as indicated by arrows 234. The glass lathe 230 is configured to rotate a bait rod (not depicted) on the axis of rotation 231 of the glass lathe 230. Silica-based glass soot 228 produced in the flame of the burner 220 is deposited onto the bait rod to form the glass optical fiber preform 232, as will be described in further detail herein.

The apparatus 200 further includes a heating system 240 coupled to the side wall 120 of the expansion chamber 110 and configured to heat at least a portion of the side wall 120 of the expansion chamber 110 to a temperature sufficient to vaporize the liquid precursor. Specifically, the side wall 120 of the expansion chamber 110 may be thermally coupled to the heating system 240 to facilitate heating at least a portion of the side wall 120 to a temperature sufficient to vaporize at least a portion of the liquid precursor which is sprayed onto the inner surface 116 of the side wall 120 with the closed-loop liquid delivery conduit 130. In embodiments, the heating system 240 comprises a hot oil heating system which circulates hot oil through the side wall 120 of the expansion chamber 110, as will be described in further detail herein.

Still referring to FIG. 1, the vaporizer 100 includes an expansion chamber 110, a closed-loop liquid delivery conduit 130, at least one supply conduit 140, and a vapor delivery outlet 150. The expansion chamber 110 is at least partially enclosed by a side wall 120 and includes an upper end 112 and a lower end 114 with the side wall 120 disposed between the upper end 112 and the lower end 114. The terms "upper" and "lower", as used herein, refer to the relative vertical orientation of the parts and the terms are used with reference to the y-axis (i.e., the vertical axis) of the coordinate axes depicted in the respective figures.

In embodiments, the expansion chamber 110 is generally cylindrical in cross section and may have an inner diameter x. In embodiments, the inner diameter x of the expansion chamber 110 may be greater than or equal to 8 centimeters (cm) and less than or equal to 25 cm. The length L of the expansion chamber 110 may be greater than or equal to 72 cm and less than or equal to 200 cm. In embodiments, the inner diameter x of the expansion chamber 110 may be approximately 16 cm and the length L of the expansion chamber 110 may be approximately 107 cm. However, it should be understood that the expansion chamber 110 may have other dimensions.

As noted herein, the expansion chamber 110 is at least partially enclosed by a side wall 120. In embodiments, an inner surface 116 of the side wall 120 of the expansion chamber may have a surface area greater than or equal to 0.18 square meters (m$^2$) and less than or equal to 1 m$^2$. In embodiments, the side wall 120 may have a surface area greater than or equal to 0.4 m$^2$ and less than or equal to 1 m$^2$, or greater than or equal to 0.4 m$^2$ and less than or equal to 0.6 m$^2$. In embodiments, the side wall 120 may have a surface area of 0.5 m$^2$. Conventional vaporizers may have a side wall surface area of less than 0.172 m$^2$, and as such, vaporizer 100 embodiments as described herein have an increased side wall 120 surface area relative to conventional vaporizers. As will be described in further detail herein, the increased surface area relative to conventional vaporizers allows the expansion chamber 110 to accommodate liquid precursor flow rates of greater than 450, 475, or 500 grams per minute (g/min) while mitigating the gelation of liquid precursor in the expansion chamber 110.

In some embodiments, the side wall 120 of the expansion chamber 110 is formed from a material having a thermal conductivity of at least 100 British Thermal Units per hour foot Fahrenheit (BTU/hr-ft-F) to facilitate vaporization of liquid precursor deposited on the inner surface 116 of the side wall 120 by heating the side wall 120 with the heat source 240.

In particular, the side wall 120 is generally formed from a material with a high thermal conductivity such that the side wall 120 of the expansion chamber 110 may be uniformly heated and localized "hot spots" are avoided. Hot spots in the expansion chamber 110 may overheat the liquid precursor which leads to gelation of the liquid precursor and fouling of the expansion chamber 110. In embodiments, the expansion chamber 110 is formed from a material which has a thermal conductivity of greater than about 100 BTU/hr-ft-F, greater than about 150 BTU/hr-ft-F, greater than about 200 BTU/hr-ft-F, or even greater than about 250 BTU/hr-ft-F. Suitable materials from which the expansion chamber 110 is formed include, without limitation, aluminum and alloys thereof, beryllium and alloys thereof, copper and alloys thereof, silver and alloys thereof, tungsten and alloys thereof and zirconium, each of which has a thermal conductivity of at least 100 BTU/hr-ft-F at room temperature.

In the embodiment depicted in FIG. 1, the side wall 120 of the expansion chamber 110 includes a plurality of channels 121 disposed in the side wall 120 and extending from the lower end 114 of the side wall 120 to the upper end 112 of the side wall 120. The plurality of channels 121 receive heated oil from the heating system 240 and direct the heated oil through the side wall 120, thereby heating the side wall 120 and vaporizing the liquid precursor sprayed on the inner surface 116 of the side wall 120. The plurality of channels 121 improve the heat transfer from the heated oil to the side wall 120. In the embodiment depicted in FIG. 1, the plurality of channels 121 is generally parallel to the length L of the expansion chamber 110. However, it should be understood that other configurations are contemplated as possible, such as configurations in which the plurality of channels 121 have a helical configuration or the like. Individual channels of the plurality of channels 121 may include an inlet 122 and an outlet 123 disposed at opposite ends of the side wall 120. In embodiments, the inlet 122 and the outlet 123 may be the same diameter. In embodiments, the plurality of channels 121 may each have an inlet 122 having a larger diameter than the corresponding outlet 123. For example, and without limitation, the inlet 122 may have a diameter greater than or equal to 0.5 cm and less than or equal to 2.54 cm, a diameter greater than or equal to 1 cm and less than or equal to 2 cm, or a diameter of 1.5 cm. The outlet 123 may have a diameter greater than or equal to 0.1 cm and less than or equal to 1 cm, a diameter greater than or equal to 0.2 cm and less than or equal to 0.5 cm, or a diameter of 0.4 cm. The diameter of the outlet 123 is less than the diameter of the inlet 122 to increase the velocity of the oil as it flows through the channel from the inlet 122 to the outlet 123. This increase in velocity directly increases the heat transfer rate of the heat from the oil to the side wall 120 to compensate for the decreased temperature of the oil as it approaches the outlet 123.

While FIG. 1 depicts the side wall 120 of the vaporizer 100 as comprising a plurality of channels 121, it should be understood that other configurations are contemplated and possible.

Figure 5:
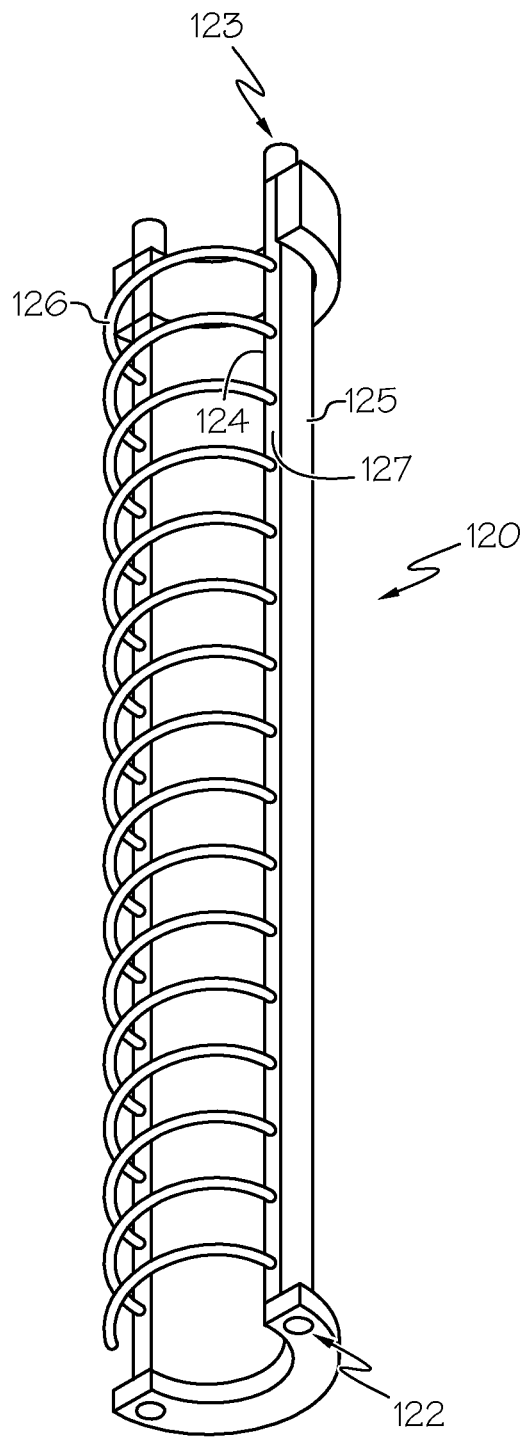
FIG. 5 schematically depicts a partial cross-section of a side wall of a vaporizer comprising a mixing insert for heating the side wall of the vaporizer, according to one or more embodiments described herein.

Referring to FIG. 5 by way of example, an alternative embodiment of the side wall 120 of the expansion chamber 110 is schematically depicted in cross section. In this embodiment the side wall 120 of the expansion chamber 110 may include an inner shell 124 (which forms the inner surface 116 of the expansion chamber 110) and an outer shell 125 spaced apart from the inner shell 124 thereby forming an annular flow path 127 between the inner shell 124 and the outer shell 125. The side wall 120 may further comprise an inlet 122 coupled to the annular flow path 127 for receiving heated oil from the heating system 240 (FIG. 1). The side wall 120 may also comprise an outlet 123 coupled to the annular flow path 127 for recirculating heated oil to the heating system 240. Specifically, heated oil from the heating system 240 is directed into the annular flow path 127 through the inlet 122 and circulated through the side wall 120, thereby heating the side wall 120 and vaporizing the liquid precursor sprayed on the inner surface 116 of the side wall 120. The heated oil exits the annular flow path 127 through the outlet 123 and is recirculated to the heating system 240. In this embodiment the side wall 120 further includes a mixing insert 126 disposed in the annular flow path 127 between the inner shell 124 and the outer shell 125. In embodiments, the mixing insert 126 extends around the inner shell 124 in a helical configuration as depicted in FIG. 5. As will be described in further detail below, the mixing insert 126 promotes turbulent flow of the heated oil flowing through the annular flow path 127, leading to more efficient heating of the side wall 120 and, therefore, more efficient heating of the expansion chamber 110.

Referring again to FIG. 1, in embodiments, the vaporizer 100 also includes a drain 160 in the lower end 114 of the expansion chamber 110 to facilitate flushing by-products of the vaporization process from the interior of the expansion chamber 110. The drain 160 may be fluidly coupled to a collection reservoir (not shown) which collects the vaporization by-products that are flushed from the interior of the expansion chamber 110.

Figure 2A:
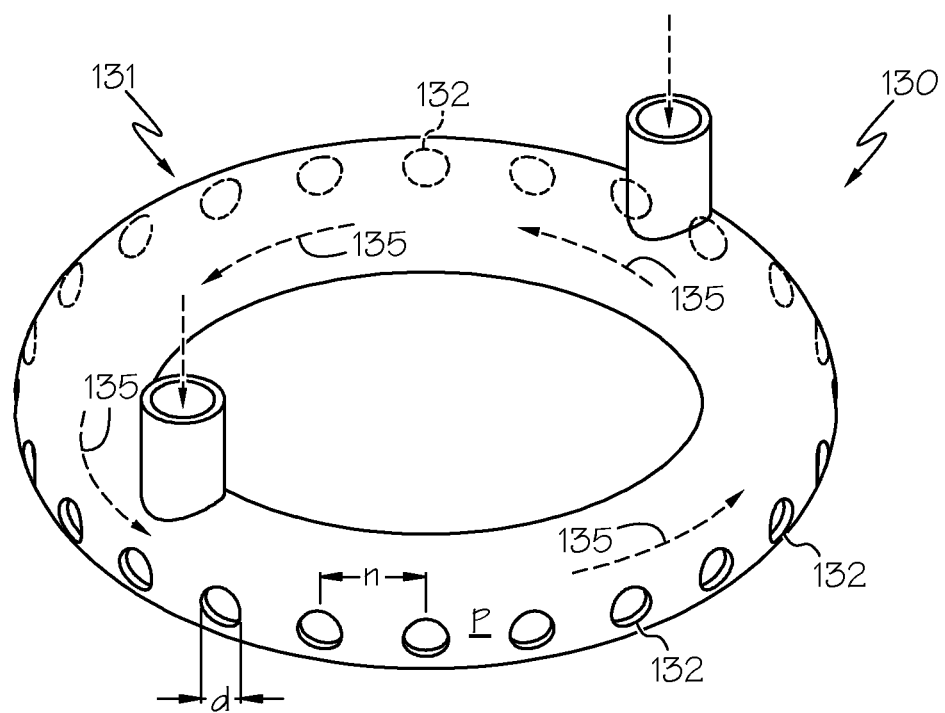
FIG. 2A schematically depicts a closed-loop liquid delivery conduit, according to one or more embodiments described herein.
Figure 2B:
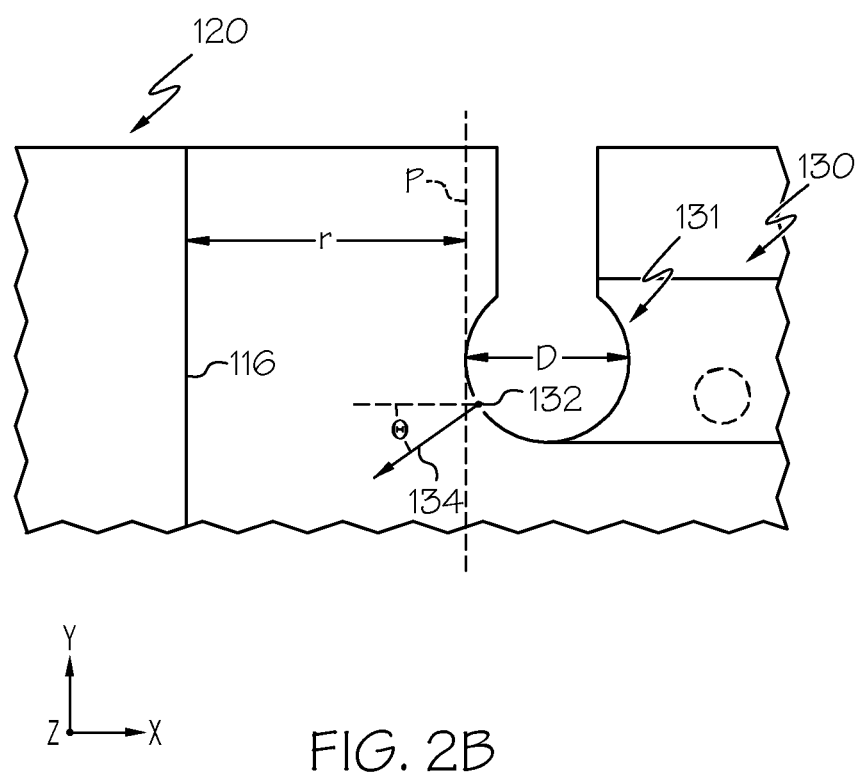
FIG. 2B schematically depicts a partial view of a portion of the vaporizer depicted in FIG. 1.

Referring now to FIGS. 1 and 2A-2B, the vaporizer 100 further includes a closed-loop liquid delivery conduit 130 comprising a plurality of nozzles 132 oriented to direct a spray of liquid precursor from the liquid precursor source 210 onto the inner surface 116 of the side wall 120 of the expansion chamber 110. The closed-loop liquid delivery conduit 130 is positioned in the expansion chamber 110 proximate to the upper end 112 of the expansion chamber 110. The phrase "proximate to the upper end of the expansion chamber," as used herein, means that the closed-loop liquid delivery conduit 130 is closer to the upper end 112 of the expansion chamber 110 than the lower end 114 of the expansion chamber 110. Positioning the closed-loop liquid delivery conduit 130 proximate to the upper end 112 of the expansion chamber 110 as depicted in FIG. 1 results in more efficient vaporization of liquid precursor compared to vaporizers in which the liquid delivery conduit is positioned proximate to the lower end 114 of the expansion chamber, thereby increasing the amount of liquid precursor vaporized in the expansion chamber 110.

In the embodiments described herein, the closed-loop liquid delivery conduit 130 comprises a conduit 131 (FIG. 2A) which defines a liquid flow path (indicated in FIG. 2A by arrows 135) without beginning or end. Accordingly, liquid precursor directed into the conduit 131 may continuously traverse the same liquid flow path until the liquid precursor is emitted from the nozzles 132 formed in the conduit 131. In the embodiment depicted in FIG. 2A the conduit 131 defines a circular flow path. However, it should be understood that other geometries are contemplated and possible including, without limitation, oval flow paths, elliptical flow paths and the like.

Referring to FIGS. 1, 2A, and 2B, the plurality of nozzles 132 are formed in the conduit 131 of the closed-loop liquid delivery conduit 130 and may be equidistantly spaced about a perimeter P of the closed-loop liquid delivery conduit 130. In the embodiments described herein, the nozzle spacing n must be small enough that the entire circumference of the inner surface 116 of the side wall 120 of the expansion chamber 110 is contacted by the spray of liquid precursor emitted by each nozzle. However, the spacing n between each nozzle of the plurality of nozzles should be large enough such that the spray of liquid precursor emitted from each nozzle does not interfere with the spray of liquid precursor from adjacent nozzles. Specifically, it is desirable to achieve a uniform coating of liquid precursor on the inner surface 116 of the side wall 120 to facilitate uniform vaporization. However, when the spray from individual nozzles interferes with the spray from adjacent nozzles, liquid precursor may be non-uniformly coated on the inner surface 116 of the side wall 120, leading to non-uniform vaporization of the liquid precursor. This may further lead to undesirable pooling and gelation of the liquid precursor in the expansion chamber 110. In embodiments, a nozzle spacing n between each nozzle of the plurality of nozzles 132 may be greater than or equal to 0.75 cm and less than or equal to 2.54 cm. In embodiments, a nozzle spacing n between each nozzle of the plurality of nozzles 132 may be greater than or equal to 0.9 cm and less than or equal to 1.9 cm.

In embodiments, individual nozzles of the plurality of nozzles 132 have a nozzle diameter d greater than or equal to 0.045 cm and less than or equal to 0.1 cm. In embodiments, individual nozzles of the plurality of nozzles 132 have a nozzle diameter d greater than or equal to 0.025 cm and less than or equal to 0.065 cm. The nozzle diameter d of each of nozzle of the plurality of nozzles 132 must be large enough such that the entire circumference of the side wall 120 of the expansion chamber 110 is contacted by liquid precursor emitted from the nozzles, but small enough that the spray of liquid precursor from each nozzle does not interfere with a spray of liquid precursor from another nozzle. A nozzle diameter d less than 0.045 cm may be susceptible to plugging, thereby reducing the efficiency of the vaporizer 100. A nozzle diameter d greater than 0.1 cm will not produce a liquid precursor spray velocity great enough for the liquid precursor to contact the side wall 120 of the expansion chamber. As noted herein, it is desirable to achieve a uniform coating of liquid precursor on the side wall 120. However, when the spray from individual nozzles interferes with the spray from another nozzle, folds will form within the overlapping spray and the liquid precursor will not uniformly coat the side wall 120. Instead, lumps of liquid precursor may form on the side wall 120, leading to inefficient vaporization of the liquid precursor, potentially resulting in less than 100% evaporation of the liquid precursor. The un-vaporized material may pool and gel in the expansion chamber, fouling the vaporizer.

Referring now to FIG. 2B, the conduit 131 of the closed-loop liquid delivery conduit 130 may be generally circular in cross section. In embodiments, the closed-loop liquid delivery conduit 130 may have an internal cross-sectional diameter D greater than or equal to 0.25 cm and less than or equal to 0.75 cm. In embodiments, the closed-loop liquid delivery conduit 130 may have a cross-sectional area greater than 3 times the cumulative cross-sectional area of the plurality of nozzles 132, which results in uniform flow of the liquid precursor.

Still referring to FIG. 2B, in embodiments of the present disclosure, a perimeter P of the closed-loop liquid delivery conduit 130 is spaced a distance r from the side wall 120 of the expansion chamber 110 as depicted in FIG. 2B. The distance r should be small enough to ensure that the spray of liquid precursor emitted by the plurality of nozzles 132 reaches the inner surface 116 of the side wall 120 and uniformly coats the inner surface 116 of the side wall 120. However, the distance r should be large enough to prevent the liquid precursor from splashing off the inner surface 116 of the sidewall 120 which may lead to pooling and gelation of the liquid precursor at the bottom of the expansion chamber 110. In embodiments, the distance r may be greater than or equal to 1 cm and less than or equal to 8 cm, greater than or equal to 1 cm and less than or equal to 5 cm, greater than or equal to 1 cm and less than or equal to 2.54 cm, or even greater than or equal to 2 cm and less than or equal to 4 cm.

As depicted in FIG. 2B, individual nozzles of the plurality of nozzles 132 may have a primary flow vector 134 oriented at an angle $\theta$ with respect to the horizontal plane (i.e., a plane parallel to the X-Z plane of the coordinate axes depicted in FIG. 2B). The primary flow vector 134 of each of the plurality of nozzles 132 dictates the orientation of the spray of liquid precursor emitted from the nozzles. Accordingly, the primary flow vector, as used herein, is defined as the direction of flow of the liquid precursor at the geometric center of the spray of liquid precursor as the spray is emitted from a nozzle at the perimeter of closed-loop liquid delivery conduit 130. In embodiments, the angle $\theta$ of the primary flow vector 134 is greater than or equal to 30° and less than or equal to 55° relative to the horizontal plane. In some embodiments, the angle $\theta$ of the primary flow vector 134 may be greater than or equal to 40° and less than or equal to 50° relative to the horizontal plane. In some embodiments, the angle $\theta$ of the primary flow vector 134 may be about 45° relative to the horizontal plane. At angles within the aforementioned ranges, splashing of the liquid precursor as it contacts the side wall 120 of the expansion chamber 110 may be minimized thereby mitigating pooling and gelation of the liquid precursor in the expansion chamber 110. At an angle $\theta$ less than or equal to 30°, splashing of the liquid precursor may result in inefficient vaporization of liquid precursor as compared to an angle $\theta$ greater than or equal to 30°. Further an angle $\theta$ greater than or equal to 30° and less than 55° may increase the amount of vaporized liquid precursor compared to an angle $\theta$ less than 30° and greater than 55°. Specifically, at an angle $\theta$ less than 30°, an increased amount of liquid precursor may be splashed off of the inner surface 116 of the sidewall 120, resulting in reduced liquid precursor evaporation and reducing the efficiency of the vaporizer 100. Furthermore, at an angle $\theta$ less than 30°, increased amounts of unvaporized liquid precursor may be carried by the vaporized liquid precursor through the vapor delivery outlet 150 to the burner 220. When the angle $\theta$ of the primary flow vector is greater than 55°, the amount of liquid precursor that contacts the inner surface 116 of the side wall 120 of the expansion chamber 110 may be reduced, resulting in reduced vaporization of liquid precursor as compared to the vaporization of liquid precursor achieved when the primary flow vector 134 is at an angle $\theta$ less than or equal to 55°. A primary flow vector with an angle $\theta$ greater than 55° may also undesirably promote pooling and gelation of liquid precursor within the expansion chamber 110.

Referring again to FIG. 1, as noted herein, the vaporizer 100 further includes at least one supply conduit 140, and a vapor delivery outlet 150. The at least one supply conduit 140 is positioned proximate the upper end 112 of the expansion chamber 110 and coupled to the closed-loop liquid delivery conduit 130 such that liquid precursor from the liquid precursor source 210 enters the expansion chamber 110 at the top of the expansion chamber 110. This configuration allows the liquid precursor to be emitted from the closed-loop liquid delivery conduit 130 and deposited on the inner surface 116 of the side wall 120 near the upper end 112 of the expansion chamber 110, thereby increasing the likelihood that the liquid precursor will vaporize prior to reaching the lower end 114 of the side wall 120. Said differently, this configuration reduces the likelihood that liquid precursor will reach the bottom of the expansion chamber in liquid form and gel within the expansion chamber 110.

In the embodiments described herein, the vapor delivery outlet 150 is coupled to the expansion chamber 110 and configured to direct vaporized liquid precursor from the expansion chamber 110 and to the burner 220.

The vaporizer 100 further includes a cap 170 positioned at the upper end 112 of the expansion chamber 110. The cap 170 at least partially encloses the expansion chamber 110. The at least one supply conduit 140 is coupled to the cap 170 and, in embodiments, may extend through the cap 170. In embodiments, the closed-loop liquid delivery conduit 130 may be spaced a distance s from the cap 170. For example, in embodiments, the distance s is greater than or equal to 0 cm and less than or equal to 40 cm. In some embodiments the distance s may be greater than or equal to 0 cm and less than or equal to 20 cm, greater than or equal to 0 cm and less than or equal to 10 cm, greater than or equal to 0 cm and less than or equal to 5 cm, greater than or equal to 5 cm and less than or equal to 40 cm, greater than or equal to 5 cm and less than or equal to 20 cm, greater than or equal to 5 cm and less than or equal to 10 cm, greater than or equal to 10 cm and less than or equal to 40 cm, greater than or equal to 10 cm and less than or equal to 20 cm, or greater than or equal to 20 cm and less than or equal to 40 cm. When the distance s is smaller, the liquid precursor is sprayed closer to the upper end 112 of the expansion chamber 110 than the liquid precursor would be sprayed if the distance s were larger. This means that a greater surface area of the inner surface 116 of the side wall 120 is available to evaporate the liquid precursor than would be available to evaporate the liquid precursor if the distance s were larger. This may result in increased efficiency of the vaporizer 100.

Figure 3:
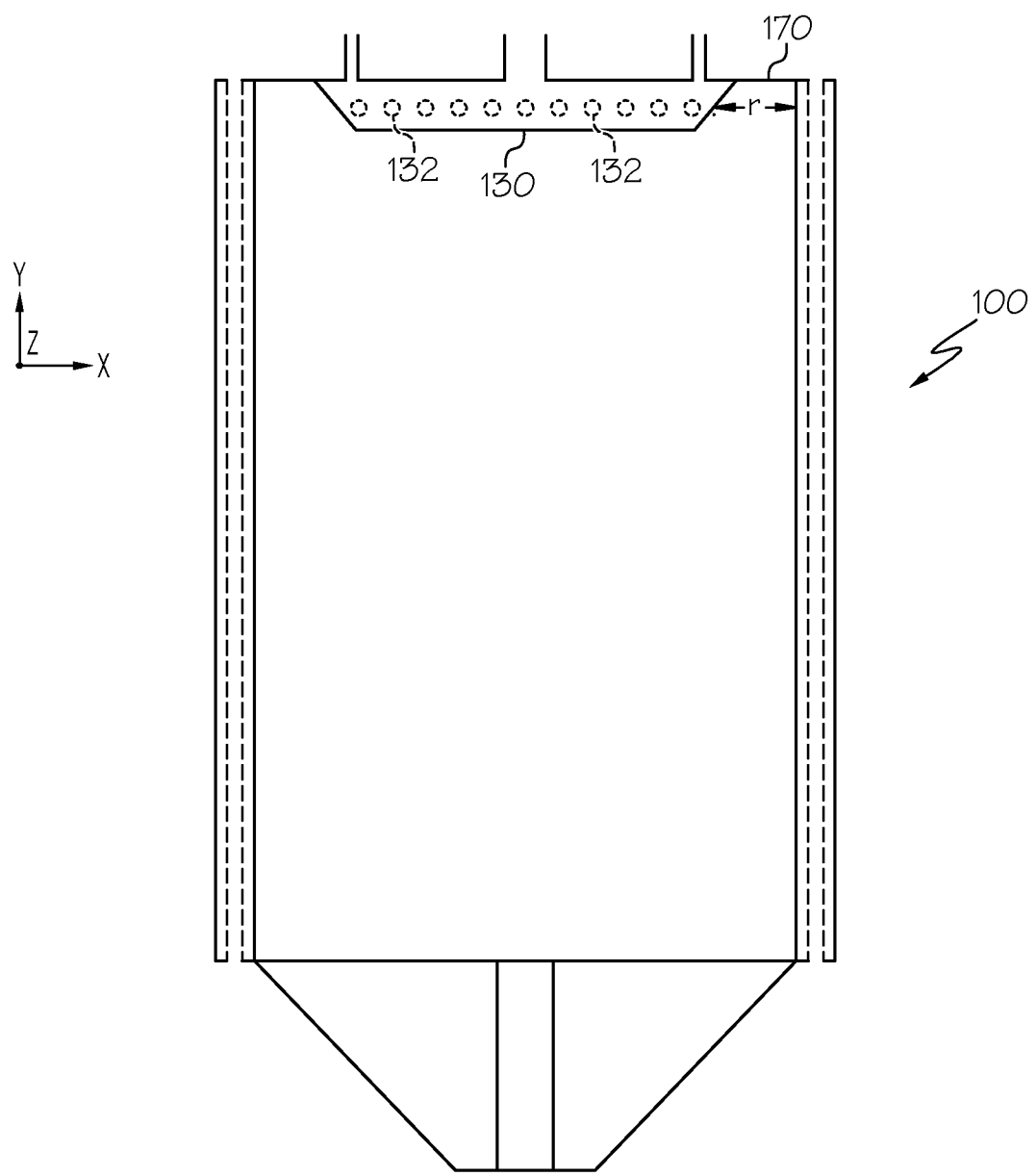
FIG. 3 schematically depicts a vaporizer, according to one or more embodiments described herein.
Figure 4:
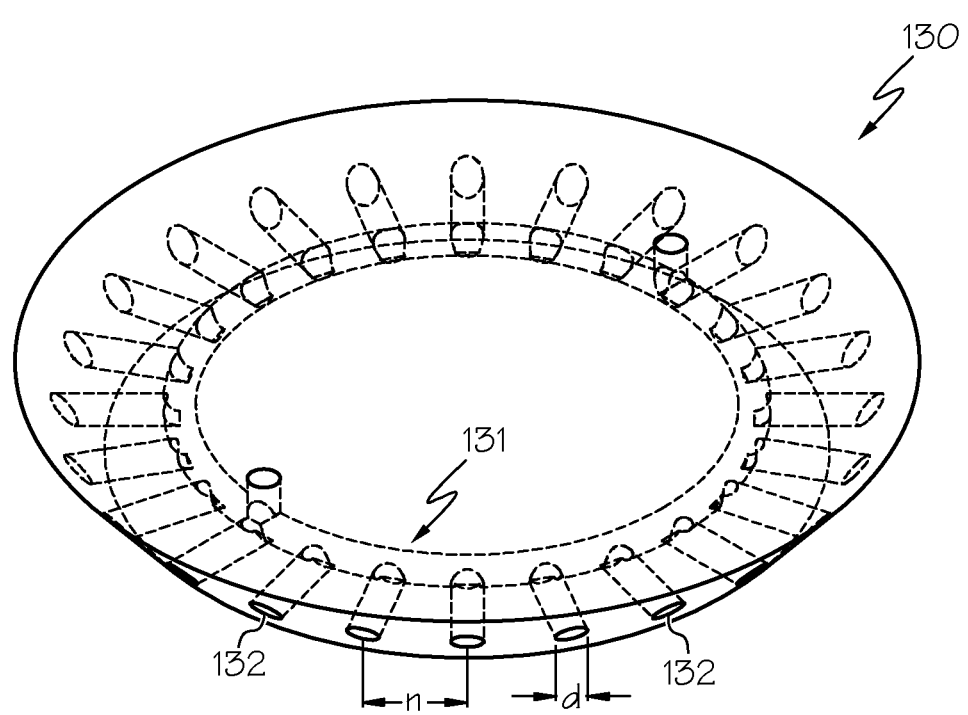
FIG. 4 schematically depicts a closed-loop liquid delivery conduit, according to one or more embodiments described herein.

While FIG. 1 shows a liquid delivery conduit coupled to the cap 170, in alternative embodiments the closed-loop liquid delivery conduit 130 may be integral with the cap 170 such that s is 0 cm. For example, FIG. 3 shows an embodiment of the vaporizer 100 in which the closed-loop liquid delivery conduit 130 is integrated with the cap 170. As such, the distance s is 0 cm. FIG. 4 shows the closed-loop liquid delivery conduit 130 of FIG. 3 in detail, depicting the plurality of nozzles 132 positioned on a perimeter of the closed-loop liquid delivery conduit 130 with a nozzle spacing n and a nozzle diameter d. The nozzle spacing n may include any of the values for the nozzle spacing n disclosed herein. The nozzle diameter d may include any of the values for the nozzle diameter d disclosed herein. Each nozzle of the plurality of nozzles 132 may also have a primary flow vector 134 oriented at an angle θ with respect to the horizontal plane as disclosed herein.

Referring again to FIG. 1, to form an optical fiber preform, the liquid precursor flows from the liquid precursor source 210 to the vaporizer 100. A non-limiting example of suitable liquid precursor is OMCTS. Specifically, the liquid precursor flows from the liquid precursor source 210 through the supply conduit 140 to the closed-loop liquid delivery conduit 130. The liquid precursor is then directed through the plurality of nozzles 132 of the closed-loop liquid delivery conduit 130 towards the inner surface 116 of the expansion chamber 110. Each of the plurality of nozzles 132 has a primary flow vector which is oriented at an angle θ relative to the horizontal plane, as described herein. The flow of liquid precursor is converted into a spray as it passes through the plurality of nozzles 132 of the closed-loop liquid delivery conduit 130. The spray of liquid precursor is directed onto the inner surface 116 of the side wall 120 of the expansion chamber 110 where it is subsequently vaporized.

More specifically, the liquid precursor may be drawn from the liquid precursor source 210 with a metering pump (not shown), such as a gear pump, or any other pump having suitable flow control and appropriate size to deliver liquid precursor at the desired pressure. In some embodiments, the liquid precursor may first pass through a preheater (not shown) which pre-heats the liquid precursor to a desired temperature. The preheater may be a heating jacket formed around the supply conduit. In embodiments, the liquid precursor may be pre-heated with the preheater to about 195° C.±2 degrees, depending on the particular species to be vaporized (described further herein) in the vaporizer 100. However, when the liquid precursor is OMCTS, the boiling point of the liquid precursor at atmospheric pressure is 175.5° C. Accordingly, to prevent the liquid precursor from boiling prior to reaching the vaporizer 100, the metering pump may be operated to pressurize the liquid precursor to at least 10 psig, more preferably at least 15 psig, as the liquid precursor flows from the liquid precursor source 210 to the vaporizer 100, thereby lowering the boiling point of the liquid precursor. In order to achieve a backpressure of at least 10 psig in the liquid precursor, individual nozzles of the plurality of nozzles may have any of the nozzle diameters described herein. A pressure sensor (not shown) may be disposed in the flow path of the liquid precursor to monitor the pressure of the liquid precursor as it is pumped from the liquid precursor source 210 to the vaporizer 100.

The liquid precursor may be delivered to the expansion chamber 110 through the closed-loop liquid delivery conduit 130 at a flow rate of greater than 450 g/min. In some embodiments, the flow rate may be from greater than or equal to 450 g/min to less than or equal to 1000 g/min, from greater than or equal to 485 g/min to less than or equal to 1000 g/min, from greater than or equal to 500 g/min to less than or equal to 1000 g/min, or from greater than or equal to 485 g/min to less than or equal to 530 g/min. The embodiments described herein may accommodate these flow rates due to the increased surface area of the inner surface 116 of the side wall 120 of the expansion chamber 110 relative to the expansion chambers of conventional vaporizers. Vaporizers with side walls comprising inner surfaces having surface areas less than those described herein may not accommodate flow rates greater than 485 g/min due to the inability of the vaporizer to efficiently vaporize the liquid precursor at such a high flow rate, ultimately resulting in gelation of the liquid precursor.

As the liquid precursor is directed into the closed-loop liquid delivery conduit 130, the side wall 120 of the expansion chamber 110 is heated by the heating system 240 to cause the vaporization of the liquid precursor sprayed thereon. In some embodiments, the heating system 240 includes a hot oil heating system as described herein. As noted herein, the side wall 120 of the expansion chamber 110 may include a plurality of channels 121 disposed in the side wall 120, and individual channels of the plurality of channels 121 may include an inlet 122 and an outlet 123 disposed at opposite ends of the side wall 120. The heating system 240 may pump heated oil into the inlet 122 of individual channels of the plurality of channels 121 such that the heated oil circulates through the individual channel and out the outlet 123. The heated oil may then circulate back to the heating system 240 to begin the cycle again.

Alternatively, the side wall 120 of the expansion chamber 110 may include an inner shell 124, an outer shell 125, and a mixing insert 126 disposed between the inner shell 124 and the outer shell 125, as described herein with respect to FIG. 5. In some embodiments, the heating system 240 may pump heated oil into the annular flow path 127 between the inner shell 124 and the outer shell 125 such that the heated oil circulates through annular flow path 127 and is mixed with the mixing insert 126. The heated oil may then circulate back to the heating system 240 to begin the cycle again. In this embodiment, the heated oil may have a more turbulent flow than when compared to an embodiment without the mixing insert 126. This turbulent flow promotes the mixing of the bulk fluid with the fluid flowing near the side wall 120 of the expansion chamber 110, thereby more efficiently heating the inner surface 116 of the side wall 120, and therefore the expansion chamber 110. This leads to more efficient vaporization of the liquid precursor.

The liquid precursor is then vaporized on the side wall 120 of the expansion chamber 110. The vaporized liquid precursor is extracted through the vapor delivery outlet 150 and fed to the burner 220 which pyrolyzes the vaporized liquid precursor, thereby creating silica-based glass soot 228. The silica-based glass soot 228 is deposited onto the bait rod rotated by the glass lathe 230 to form the glass optical fiber preform 232.

EXAMPLES

The embodiments described herein will be further clarified by the following examples.

Example 1

Three configurations of closed-loop liquid delivery conduits as described herein were modeled using Ansys Fluent computational fluid dynamics (CFD) simulation software to determine the interaction of the fluid flow before the liquid precursor contacted the side wall of the expansion chamber. The flow distribution of each configuration was modeled at a liquid precursor flow rate of 485 g/min. The nozzle diameter and number of nozzles on the closed-loop liquid delivery conduits for each configuration are shown in Table 1, below. Table 1 also includes the flow deviation (%) and pressure drop (Pa) for each configuration.

TABLE 1

| | Nozzle number and diameter | | | |
|---|---|---|---|---|
| | Number of Nozzles | Nozzle diameter (cm) | Flow deviation (%) | Pressure Drop (Pa) |
| Configuration 1 | 24 | 0.045 | 0.53 | 2021 |
| Configuration 2 | 24 | 0.091 | 9.67 | 211 |
| Configuration 3 | 48 | 0.045 | 1.84 | 624 |

The nozzle outlet area of Configuration 2 is four times that of Configuration 1, due to the increased nozzle diameter. The nozzle diameter in Configuration 3 is the same as Configuration 1, Configuration 3 has twice as many nozzles as Configuration 1, and therefore the spacing between adjacent nozzles was cut in half. The density of the nozzles was highest in Configuration 1. The peak to peak flow deviation represents the variation in flow rate at each individual nozzle compared to the mean flow rate. A lesser peak to peak flow deviation indicates flow uniformity, whereas a greater peak to peak flow deviation indicates uneven flow. The model showed that the Configuration 1 offered the best flow uniformity with a peak to peak flow deviation of less than 1%.

Furthermore, the model analyzed the effectiveness with which the OMCTS dispersed on the inner surface of the side wall of the expansion chamber, which is directly related to OMCTS vaporization efficiency. The model showed that the interaction between fluid flow from adjacent nozzles was more prominent in Configurations 2 and 3 than in Configuration 1. The interaction between fluid flow from adjacent nozzles upon contacting the inner surface of the side wall of the expansion chamber resulted in the formation of OMCTS lumps, leaving the thickness of the OMCTS film on the inner surface of the side wall non-uniform. This non-uniformity may affect the performance of the vaporizer, resulting in less than 100% OMCTS vaporization (i.e., increased pooling/gelation). The model showed that Configuration 1 resulted in the most uniform OMCTS film thickness (i.e., increased vaporization, decreased pooling/gelation).

Example 2

Figure 6:
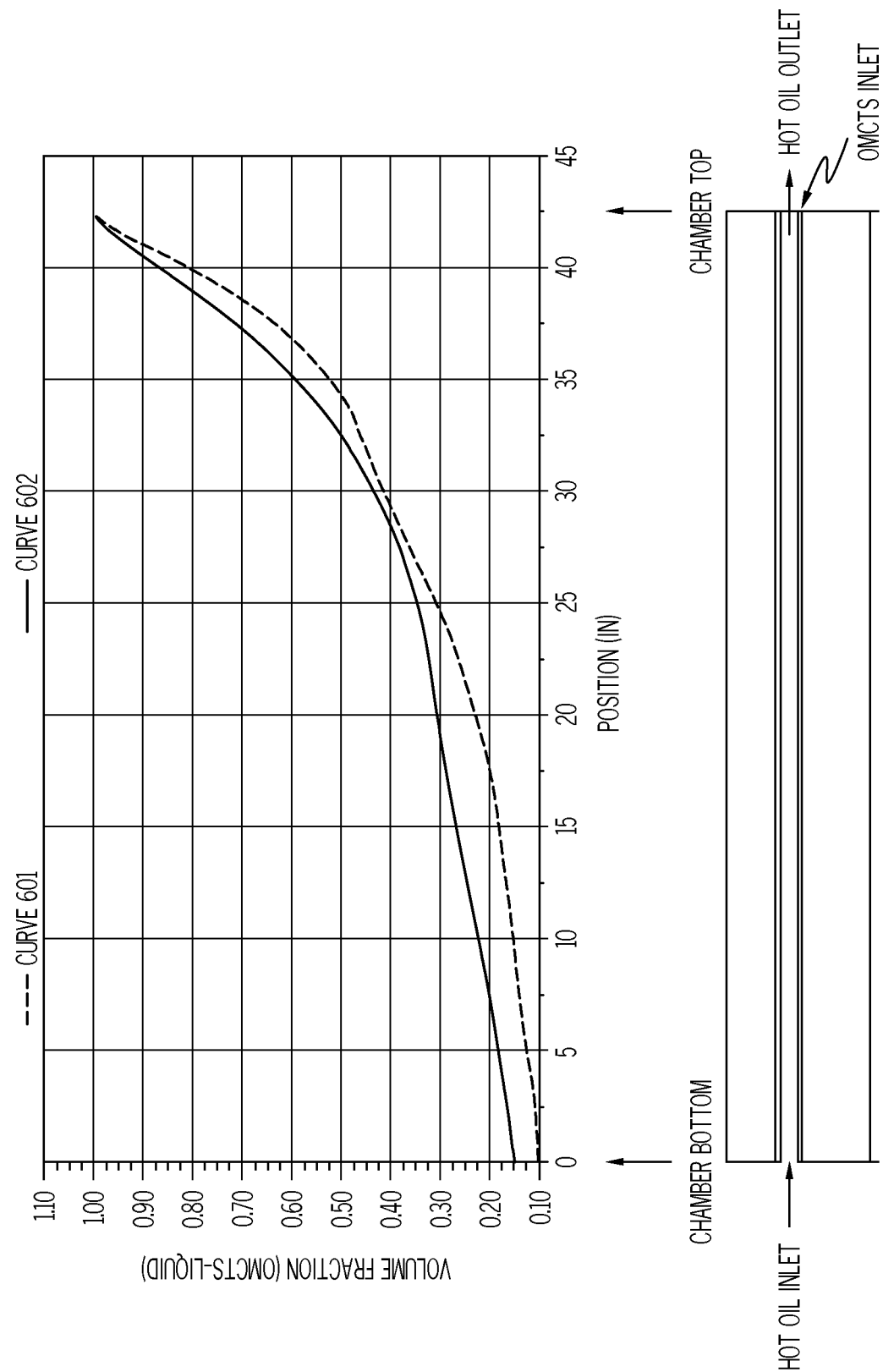
FIG. 6 graphically depicts the liquid precursor volume fraction (y-axis) as a function of the length of the side wall of the expansion chamber (x-axis) for two liquid precursor flow rates, with and without mixing inserts, according to one or more embodiments described herein.

Referring to FIG. 6, an Ansys Fluent CFD model was used to determine the volume fraction of liquid precursor present along the side wall of the expansion chamber for an expansion chamber constructed as depicted in FIG. 5, both when a mixing insert is present inside the annular flow channel and when it is not. In this experiment, the liquid precursor was heated to 210° C., the inner diameter of the chamber was 6 inches (15.24 cm), and the length of the chamber was 45 inches (114.3 cm). FIG. 6 graphically depicts the relationship between the volume fraction of the liquid precursor (y-axis) and the length of the side wall of the expansion chamber (x-axis) for two flow rates of liquid precursor, with and without a mixing insert disposed in the annular flow channel. Curve 601 represents the volume fraction of liquid precursor present along the length of the side wall when the mixing insert is present and the heated oil flows at a rate of 10 gallons per minute (37.9 liters per minute). Curve 602 represents the volume fraction of liquid precursor present along the length of the side wall when the mixing insert is not present and the heated oil flows at a rate of 25 gallons per minute (94.6 liters per minute). Without intending to be bound by theory, it is believed that the flow of the heated oil is more turbulent when the helical inserts are present, leading to more efficient heating. The mixing insert created a turbulent flow regime which mixed the oil from the bulk of the flow with the oil flowing near the side wall. The oil flowing near the side wall was cooler than the oil from the bulk of the flow due to the heat transfer from the oil to the side wall. Therefore, mixing the cooler oil with the oil from the bulk of the flow increased the temperature of the oil near the side wall and promoted heat transfer from the oil to the side wall, which thereby increased the vaporization rate. This is confirmed by a comparison of Curves 601 and 602 in FIG. 6. The volume fraction of liquid precursor present along the side wall of the expansion chamber is consistently less in Curve 601 than it is in Curve 602. Therefore, a side wall with a mixing insert results in a greater vaporization rate of the liquid precursor than a side wall without a mixing insert. Furthermore, due to the turbulent flow which promotes heat transfer, and as shown in FIG. 6, a side wall with the mixing insert and a lesser oil flow rate may achieve a greater vaporization rate of the liquid precursor than a side wall without a mixing insert and a greater oil flow rate.

Example 3

Figure 7:
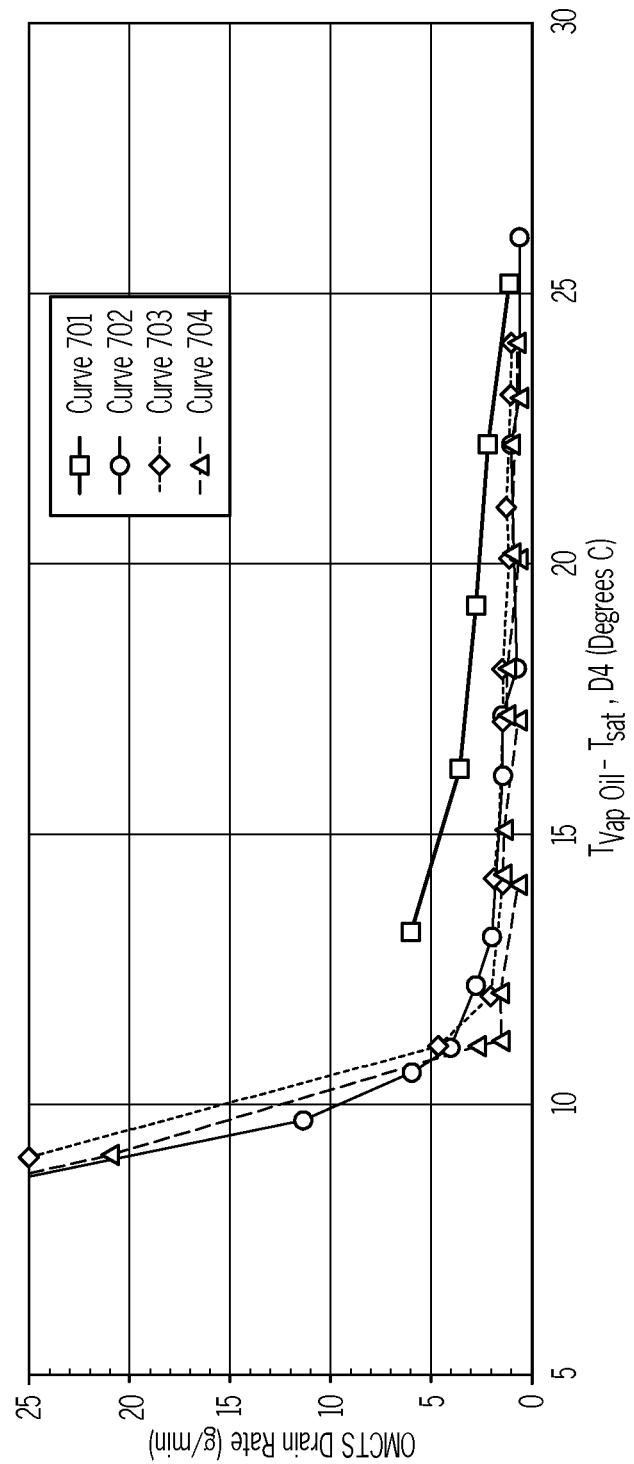
FIG. 7 graphically depicts the drain rate of liquid precursor (y-axis) as a function of the difference between the temperature of vaporized liquid precursor and the temperature of saturated liquid precursor (x-axis) for various vaporizers, according to one or more embodiments described herein.

Referring to FIG. 7, four vaporizer configurations were tested compare the drain rate of liquid precursor as an indicator of the degree of vaporization for each configuration. In this experiment, OMCTS was heated to 195° C., and was introduced to the vaporizers at a flow rate of 650 g/min. FIG. 7 graphically depicts the relationship between the drain rate of the liquid precursor (y-axis) and the difference between the temperature of vaporized liquid precursor and the temperature of saturated liquid precursor (x-axis) for various vaporizers.

Curve 701 represents a conventional vaporizer including a conventional liquid delivery system with nozzles spaced a distance of 4 cm from the side wall of the expansion chamber. Curve 702 represents a vaporizer as disclosed herein where the side wall of the expansion chamber has a surface area of 0.18 m², and the side wall includes an inner shell, an outer shell spaced from the inner shell, and a mixing insert disposed in the annular flow channel between the inner shell and the outer shell. Curve 703 represents a vaporizer as disclosed herein where the side wall of the expansion chamber has a surface area of 0.18 m², and the side wall includes a plurality of channels disposed in the side wall. Curve 704 represents a vaporizer as disclosed herein where the side wall of the expansion chamber has a surface area of 0.18 m², and the side wall includes a plurality of channels disposed in the side wall, and a closed-loop liquid delivery conduit spaced a distance of 1.8 cm from the side wall.

As shown in FIG. 7, the vaporizer configurations represented by Curves 702, 703, and 704 each achieve nearly 100% vaporization of the liquid precursor with a vaporizer wall temperature of nearly 14° C. less than conventional vaporizer configuration represented by Curve 701.

Example 4

The CFD model from Example 2 was used to investigate the influence of the primary flow vector angle θ of the plurality of nozzles on splashing of the liquid precursor from the inner surface of the side wall of the expansion chamber when the liquid precursor is sprayed. Nozzles at an angle θ of 0°, at an angle θ of 15°, at an angle θ of 30°, and at an angle θ of 45° were modeled. The nozzle at an angle θ of 0° sprayed the liquid precursor perpendicular to the inner surface of the side wall of the expansion chamber, and the spray of liquid precursor contracting the inner surface of the side wall was spread in all directions on the inner surface of the side wall. The CFD model showed that splashing was greatly reduced by increasing the angle θ. Furthermore, an increase in the angle θ ensured that the liquid precursor flowed predominately downward when the spray of liquid precursor contacted the inner surface of the side wall of the expansion chamber. Of the four nozzle angles modeled, the nozzle having a primary flow vector with an angle θ of 45° had the best performance. The model also indicated that increasing the angle θ beyond, for example, 55° resulted in a significant decrease in the amount of liquid precursor vaporized.

It will be apparent to those skilled in the art that various modifications and variations may be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An apparatus comprising a vaporizer configured to vaporize liquid precursor for formation of glass optical fiber preforms, the vaporizer comprising:
    an expansion chamber at least partially enclosed by a side wall, the expansion chamber comprising an upper end and a lower end with the side wall disposed between the upper end and the lower end;
    a closed-loop liquid delivery conduit positioned in the expansion chamber proximate to the upper end of the expansion chamber, wherein the closed-loop liquid delivery conduit is an annular liquid delivery conduit, the closed-loop liquid delivery conduit comprising a plurality of nozzles oriented to direct a spray of liquid precursor onto an inner surface of the side wall, and
    a perimeter of the closed-loop liquid delivery conduit being spaced a distance r from the side wall of the expansion chamber, the distance r being greater than or equal to 1 centimeter and less than or equal to 2.54 centimeters; and
    at least one supply conduit positioned proximate the upper end of the expansion chamber and coupled to the closed-loop liquid delivery conduit.

2. The apparatus of claim 1, further comprising: a cap positioned at the upper end of the expansion chamber and at least partially enclosing the expansion chamber, wherein the at least one supply conduit extends through the cap.

3. The apparatus of claim 2, wherein the closed-loop liquid delivery conduit is spaced a distance s from the cap, wherein s is greater than or equal to 0 centimeters and less than or equal to 40 centimeters.

4. The apparatus of claim 3, wherein s is 0 centimeters.

5. The apparatus of claim 1, wherein the closed-loop liquid delivery conduit comprises an internal cross-sectional diameter greater than or equal to 0.25 centimeters and less than or equal to 0.75 centimeters.

6. The apparatus of claim 1, wherein the plurality of nozzles are equidistantly spaced about the perimeter of the closed-loop liquid delivery conduit.

7. The apparatus of claim 1, wherein the plurality of nozzles comprise a primary flow vector oriented at an angle θ greater than or equal to 30° and less than or equal to 55° relative to a horizontal plane.

8. The apparatus of claim 1, wherein the plurality of nozzles comprise a nozzle diameter greater than or equal to 0.045 centimeters and less than or equal to 0.1 centimeters.

9. The apparatus of claim 1, wherein the plurality of nozzles comprise a nozzle spacing greater than or equal to 0.75 centimeters and less than or equal to 2.54 centimeters.

10. The apparatus of claim 1, wherein the inner surface of the side wall of the expansion chamber has a surface area greater than or equal to 0.18 square meters and less than or equal to 1 square meter.

11. The apparatus of claim 1, wherein the side wall of the expansion chamber is formed from a material having a thermal conductivity of at least 100 BTU/hr-ft-F.

12. The apparatus of claim 1, wherein the side wall of the expansion chamber comprises a plurality of channels disposed in the side wall.

13. The apparatus of claim 1, wherein the side wall of the expansion chamber comprises an inner shell, an outer shell spaced from the inner shell, and a mixing insert disposed in an annular flow channel between the inner shell and the outer shell, the mixing insert extending around the inner shell in a helical configuration.

14. An apparatus for forming glass optical fiber preforms, the apparatus comprising:
    a vaporizer comprising:
        an expansion chamber at least partially enclosed by a side wall, the expansion chamber comprising an upper end and a lower end with the side wall disposed between the upper end and the lower end;
        a cap positioned at the upper end of the side wall and at least partially enclosing the expansion chamber, wherein at least one supply conduit extends through the cap;
        a closed-loop liquid delivery conduit positioned in the expansion chamber proximate to the upper end of the expansion chamber, wherein the closed-loop liquid delivery conduit is an annular liquid delivery conduit and is coupled to the at least one supply conduit,
            the closed-loop liquid delivery conduit comprising a plurality of nozzles oriented to direct a spray of liquid precursor onto an inner surface of the side wall, each of the nozzles comprising a primary flow vector oriented at an angle θ greater than or equal to 30° and less than or equal to 55° relative to a horizontal plane, and
            a perimeter of the closed-loop liquid delivery conduit being spaced a distance r from the side wall of the expansion chamber, the distance r being greater than or equal to 1 centimeter and less than or equal to 2.54 centimeters; and
        a vapor delivery outlet coupled to the expansion chamber and configured to extract vaporized liquid precursor from the expansion chamber;
    a liquid precursor source coupled to the at least one supply conduit;
    a burner coupled to the vapor delivery outlet; and
    a glass lathe configured to rotate the glass optical fiber preform, wherein the burner is configured to translate along an axis of rotation of the glass lathe.

15. The apparatus of claim 14, wherein the liquid precursor is delivered to the expansion chamber at a flow rate greater than 475 grams per minute.

16. The apparatus of claim 14, wherein the side wall of the expansion chamber comprises an inner shell, an outer shell, and a mixing insert disposed between the inner shell and the outer shell, the mixing insert extending around the inner shell in a helical configuration.

17. The apparatus of claim 14, further comprising a heating system coupled to the side wall of the expansion chamber and configured to heat at least a portion of the side wall to a temperature sufficient to vaporize the liquid precursor.

18. The apparatus of claim 14, wherein a nozzle spacing of the plurality of nozzles is greater than or equal to 0.75 centimeters and less than or equal to 2.54 centimeters.

* * * * *

UNITED STATES PATENT AND TRADEMARK OFFICE
CERTIFICATE OF CORRECTION

PATENT NO. : 11,649,186 B2
APPLICATION NO. : 16/782319
DATED : May 16, 2023
INVENTOR(S) : Stephen Mitchell Carlton et al.

It is certified that error appears in the above-identified patent and that said Letters Patent is hereby corrected as shown below:

On the Title Page

On the page 2, in Column 2, under "Other Publications", Line 3, delete "Oligimers,"" and insert -- Oligomers," --.

Signed and Sealed this
Thirtieth Day of January, 2024

Katherine Kelly Vidal
*Director of the United States Patent and Trademark Office*